United States Patent
Glithero

(12) 
(10) Patent No.: US 6,903,720 B1
(45) Date of Patent: Jun. 7, 2005

(54) CURSOR CONTROL CONSOLE WITH ROTARY KNOB AND METHOD OF USE

(75) Inventor: Jason I. Glithero, Maricopa, AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 08/939,050

(22) Filed: Sep. 26, 1997

(51) Int. Cl.$^7$ .............................................. G09G 5/00
(52) U.S. Cl. ................................... 345/156; 345/157
(58) Field of Search ............................ 345/156, 157, 345/159, 161, 163, 164, 167, 173, 18, 184; 701/201, 203, 213

(56) References Cited

U.S. PATENT DOCUMENTS

| | | | |
|---|---|---|---|
| 4,053,893 A | * 10/1977 | Boyer | 343/112 PT |
| 4,203,063 A | * 5/1980 | Loeb et al. | 318/603 |
| 4,974,183 A | 11/1990 | Miller | 708/142 |
| 5,270,689 A | 12/1993 | Hermann | 345/145 |
| 5,296,846 A | 3/1994 | Ledley | 345/161 |
| 5,298,919 A | 3/1994 | Chang | 345/163 |
| 5,351,161 A | 9/1994 | MacKay et al. | 360/137 |
| D354,092 S | 1/1995 | Ho | D14/117.6 |
| D357,947 S | 5/1995 | Richer | D14/117.5 |
| D359,955 S | 7/1995 | Barrett | D14/114 |
| 5,438,331 A | * 8/1995 | Gilligan et al. | 341/35 |
| D362,693 S | 9/1995 | Carter et al. | D14/117.6 |
| D362,872 S | 10/1995 | Chan | D14/117.5 |
| 5,455,556 A | 10/1995 | Ohm et al. | 338/114 |
| D365,605 S | 12/1995 | Jensen et al. | D14/117.7 |
| 5,473,344 A | 12/1995 | Bacon et al. | 345/163 |
| 5,500,696 A | * 3/1996 | Masuda et al. | 351/205 |
| 5,563,629 A | * 10/1996 | Caprara | 345/160 |
| D378,211 S | 2/1997 | Kuo | D14/114 |
| 5,604,489 A | * 2/1997 | Hyatt, Jr. | 340/5.55 |
| D378,302 S | 3/1997 | Kin-Man Tse | D14/117.7 |
| 5,626,427 A | 5/1997 | Klauber et al. | 400/486 |
| 5,627,531 A | * 5/1997 | Posso et al. | 341/22 |
| 5,627,547 A | * 5/1997 | Ramaswamy et al. | 342/357.08 |
| D381,048 S | 7/1997 | Lee | D14/117.7 |
| D381,701 S | 7/1997 | Salinas | D14/117.6 |
| 5,825,353 A | * 10/1998 | Will | 345/184 |
| 5,841,428 A | * 11/1998 | Jaeger et al. | 345/184 |
| 6,025,831 A | * 2/2000 | Gardiner | 345/157 |
| 6,314,366 B1 | * 11/2001 | Farmakis et al. | 701/201 |
| 6,373,463 B1 | * 4/2002 | Beeks | 345/156 |
| 2003/0210286 A1 | * 11/2003 | Gerpheide et al. | 345/863 |
| 2004/0017355 A1 | * 1/2004 | Shim | 345/157 |

FOREIGN PATENT DOCUMENTS

| | | |
|---|---|---|
| DE | 36 24 025 A1 | 1/1988 |
| EP | 0 662 669 A2 | 7/1995 |
| GB | 2174663 | * 11/1986 |
| WO | WO 95/09402 | 4/1995 |

OTHER PUBLICATIONS

"Flight–deck display on the Boeing 777" Dec. 1994, Areospace Engneering, PP 11–16.*

European Patent Office, European Search Report, Jan. 20, 1999.

* cited by examiner

*Primary Examiner*—Amare Mengistu

(57) ABSTRACT

A rotary knob is integrated into a cursor control console and facilitates entering of alpha and numeric data into an aircraft computer system. The console houses both a cursor control device and the rotary knob. The rotary knob is located within finger reach of the cursor control device such that an operator can manipulate either control with only movement of the users fingers, hand, and/or wrist. An operator manipulates the cursor control device to select a desired parameter. The operator then spins or rotates the knob to select the desired alpha or numeric value.

8 Claims, 5 Drawing Sheets

CURSOR CONTROL CONSOLE WITH ROTARY KNOB AND METHOD OF USE

BACKGROUND OF INVENTION

The present invention relates generally to input devices and more specifically to vehicle based cursor control input devices.

Computers are used in a wide range of applications from desktop personal computers for home and business applications to flight decks of jumbo jets for controlling the flight and operation of the aircraft. As computers have become more powerful, the need for improved human interfaces has become more important. Current computers typically use graphical user interfaces(GUIs) to improve and simplify the human interface. Graphical user interfaces use a cursor to select, activate, and manipulate various symbols, pages, icons, scroll bars, etc. on a display to accomplish desired results.

The cursor is controlled using a cursor control device (CCD) such as a mouse, trackball, joystick, touchpad, or the like. These devices are typically accompanied by one or more buttons which the operator activates to select or enter various commands or data.

Most CCDs function well in fixed or stable environments, however, they are difficult to use in vehicles where turbulence makes a CCD difficult to precisely control. CCDs are particularly difficult to use in an aircraft where space is limited and the environment can be extremely turbulent during bad weather.

In order to solve some of the problems related to CCDs in vehicles, CCDs mounted in a housing as shown in FIG. 1 were developed. FIG. 1 shows a prior art cursor control console 10 comprising a housing 11, wrist rest 11A, CCD 12, select button 13, and multi-function buttons 14. Console 10 is typically located on the center console or pedestal of an aircraft flight deck. This location is convenient to both the pilot and copilot. The pilot or copilot position their wrist or palm of their hand on the wrist rest 11A while manipulating CCD 12 with a finger. Wrist rest 11A provides stability to the pilot's fingers during turbulence.

CCD 12 is a touchpad/glide-mouse type cursor control device. The pilot manipulates a cursor on a display via CCD 12 then actuates select button 13 to select or enter the desired data. Multi-function buttons 14 provide additional input functionality such as active display device selection.

The consoles and CCDs of the prior art are deficient in that it is difficult to enter alpha and numeric data using the CCD. Entering alphanumeric data with a typical CCD is slow and cumbersome. As a consequence, current aircraft flight decks have a multitude of dedicated knobs and keypads for entering data into the various aircraft control panels and systems.

Aircraft flight deck human interfaces would be greatly improved, and costs reduced by a cursor control console capable of entering alpha and numeric data quickly, conveniently, and accurately during turbulent conditions.

SUMMARY OF THE INVENTION

The invention discloses a control console having both a cursor control device(CCD) and a rotary knob to facilitate entering alpha and numeric data. The rotary knob is located within finger reach of the cursor control device such that an operator can manipulate either the CCD or the knob with movement of only the operator's fingers, hand, and/or wrist.

An operator manipulates the cursor control device to select a desired parameter then spins or rotates the rotary knob to display the desired alpha or numeric value. A button is provided to select or enter the data. The method of using the invention significantly enhances the human interface of an aircraft flight deck.

The invention is an improvement over the conventional control console shown in FIG. 1. The key to the invention is a rotary knob which is located within finger reach of the CCD. The addition of the rotary knob provides several advantages over the prior art.

The first advantage is accessibility of the knob. Since the pilot or operator's hand is already on the console, it is convenient to have the knob there also.

Another advantage is less distraction of the pilot. Prior systems required the pilot to visually locate dedicated control knobs then manipulate them as desired. The pilot is distracted while locating and manipulating these knobs. The invention locates the knob conveniently so that the pilot can easily locate the knob without visual assistance.

Yet another advantage is reduced cost. When used in cooperation with a GUI, a single rotary knob on the console replaces many dedicated control knobs.

Therefore, the objects of the invention are to simplify the operator interface, reduce pilot/operator distraction, reduce the number of dedicated control panels, and reduce costs.

A feature of the invention is a control console having a rotary knob within finger reach of a CCD.

The significant features of the invention are illustrated in the figures and described more fully below.

DETAILED DESCRIPTION

This description describes the invention as embodied in an aircraft flight deck/cockpit, however the invention is useful in other environments such as land and water based vehicles.

Figure 1:
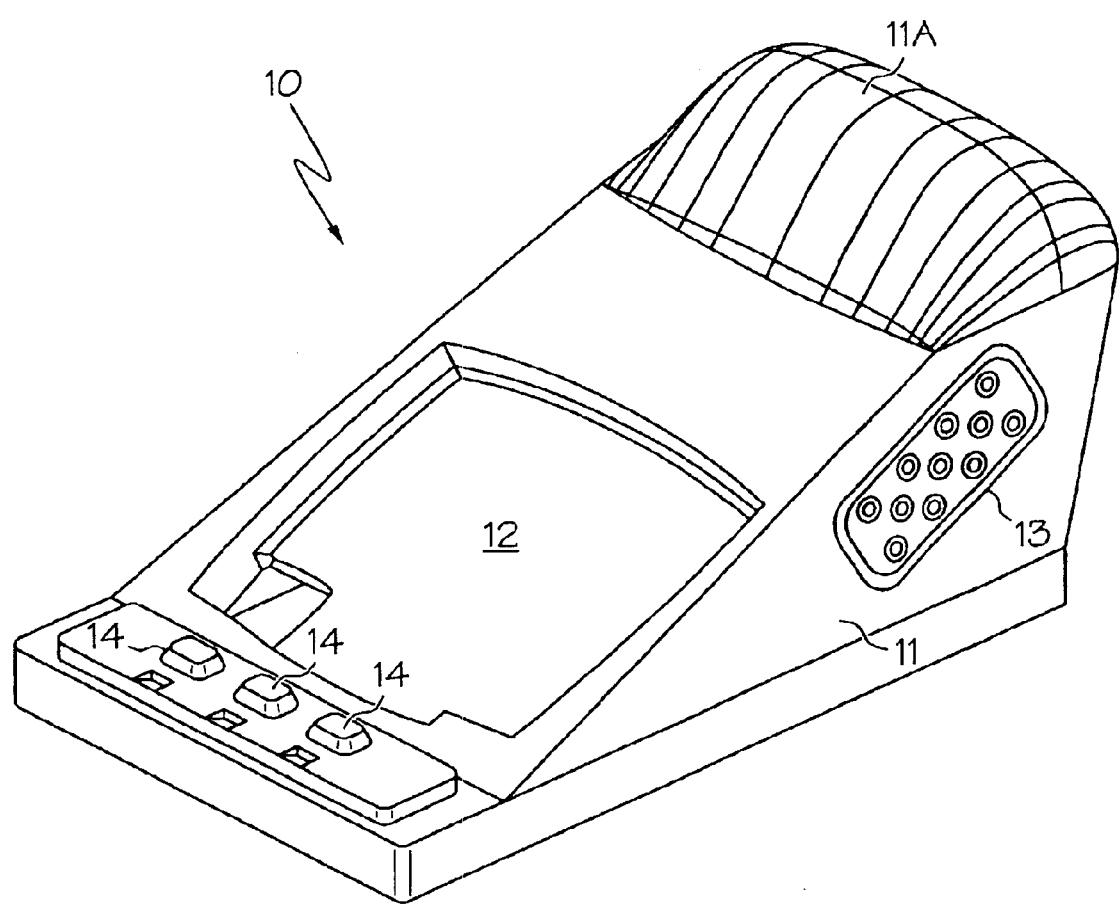
FIG. 1 illustrates a prior art control console.
Figure 2:
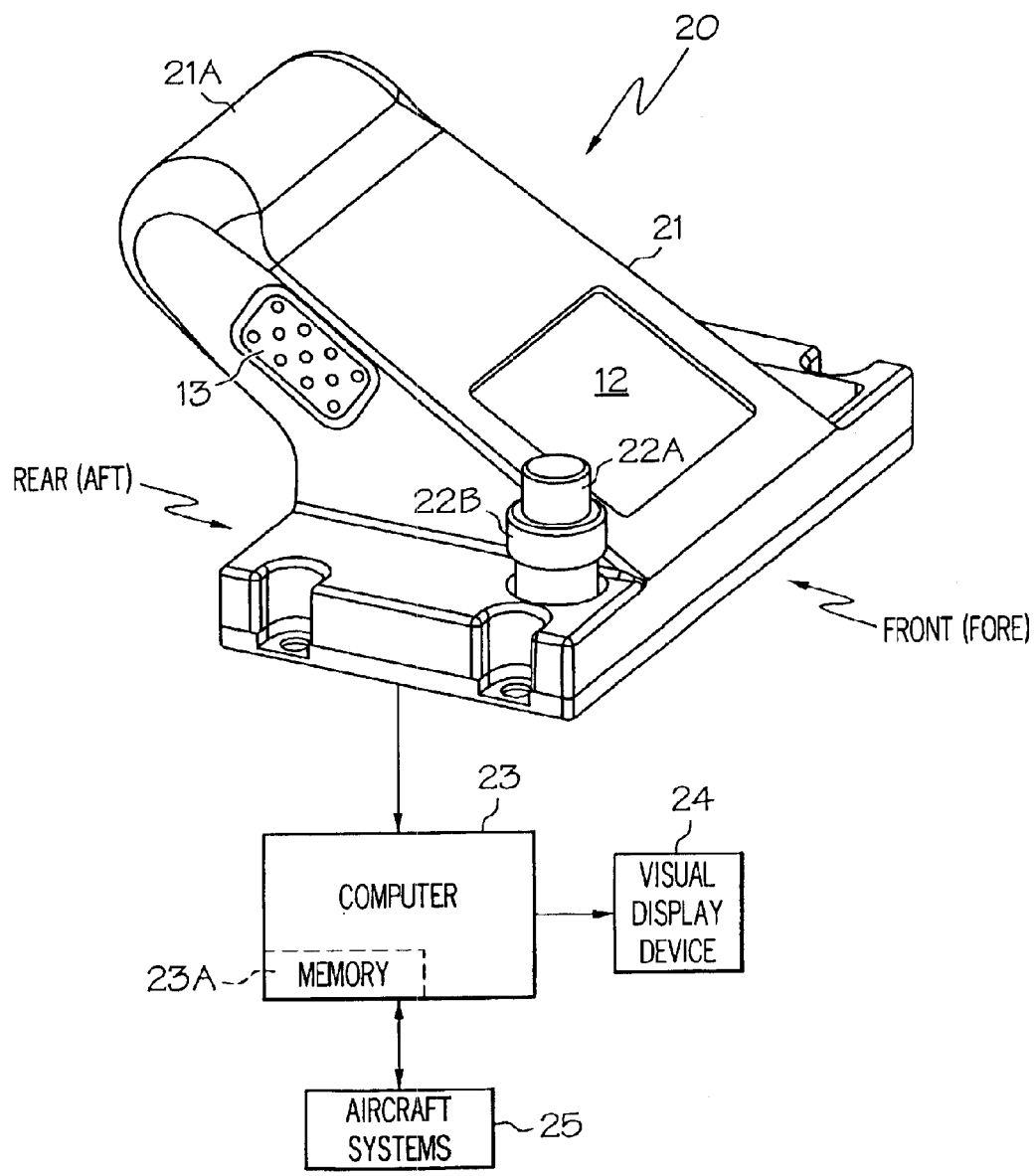
FIG. 2 illustrates the preferred embodiment of the invention.

FIG. 2 illustrates the preferred embodiment of the invention. Control console 20 includes housing 21, wrist rest 21A, CCD 12, select buttons 13, and rotary knob 22. The ergonomics of console 20 are similar in some respects to the prior art. Console 20 is preferably located to the side of the pilot's seat within easy reach of the pilot. The pilot/operator positions his wrist or hand on the wrist rest 21A while manipulating CCD 12, rotary knob 22, and select button 13.

The key to the invention is rotary knob 22 which is within finger reach of CCD 12. The phrase "within finger reach" refers to the close proximity of the knob 22 and CCD 12. It means that rotary knob 22 and CCD 12 are sufficiently near to each other such that the pilot/operator can move to manipulate either device using movement of primarily only the fingers, hand, and wrist. Rotary knob 22 of the preferred embodiment uses a conventional grey code coarse-fine knob mounted axially to the housing 21. Knob 22 includes both a coarse knob 22B and a fine knob 22A. Coarse knob 22B permits large changes to be made quickly to a selected parameter. Fine knob 22A permits small precise changes to a selected parameter.

CCD 12 is preferably a touchpad or glide mouse type cursor control device. Touchpads are well known. They permit an operator to control the X-Y movements of a cursor by movement of a finger over the surface of the touchpad. Other CCD devices which are usable in accordance with the invention include trackballs, joysticks, and the like. CCD 12 generates a CCD signal indicative of operator manipulation of the CCD.

Select button 13 is of conventional design. Two select buttons 13 are provided, one on each side of housing 21. Select button 13 provides an input signal useful for indicating a selection or activation of a parameter, symbol, icon, action, etc. similar to buttons on a mouse type CCD.

Wrist rest 21A is similar to the prior art. Rest 21A provides an area for positioning the operator's wrist or hand. The rest 21A is a fixed location in reference to both the CCD 12 and knob 22 such that once the operator's hand or wrist is positioned on the rest 21A, both CCD 12 and knob 22 are easily located without visual aide.

Console 20 communicates with at least one computer 23. Communications include data from CCD 12, knob 22, and select button 13. CCD 12 generates a CCD signal representative of X-Y manipulations of the CCD by the operator. Knob 22 generates a rotary signal representative of rotary movement of the knob 22. The rotary signal includes data representative of both the coarse and fine knobs 22A and 22B. Select buttons 13 generate a select signal indicative of buttons 13 activation. Each of these signals are communicated to computer 23.

Computer 23 is a conventional computer/microprocessor which communicates with various aircraft systems 25. Computer 23 also is in communication with visual display device 24 to coordinate the cursor control commands from the CCD 12 with the cursor symbol on display device 24. Computer 23 includes a memory 23A capable of storing computer instructions and data. Memory is any combination of random access memory(RAM), read only memory(ROM), disk storage, or the like.

Visual display device 24 is a flat panel type electronic display. Other types of electronic displays are also compatible with the invention. Display device 24 displays the GUI interface to the pilot enabling her to view the cursor location and the various symbology.

Computer 23 is also in communication with various aircraft systems such as sensors, communications systems, utilities, navigation systems, control surfaces, engines, and the like. This configuration permits the pilot to control numerous aircraft function from the invention's control console.

Several other embodiments of the invention are envisioned. The major differences being the location and shape of the rotary knob.

Figure 3A:
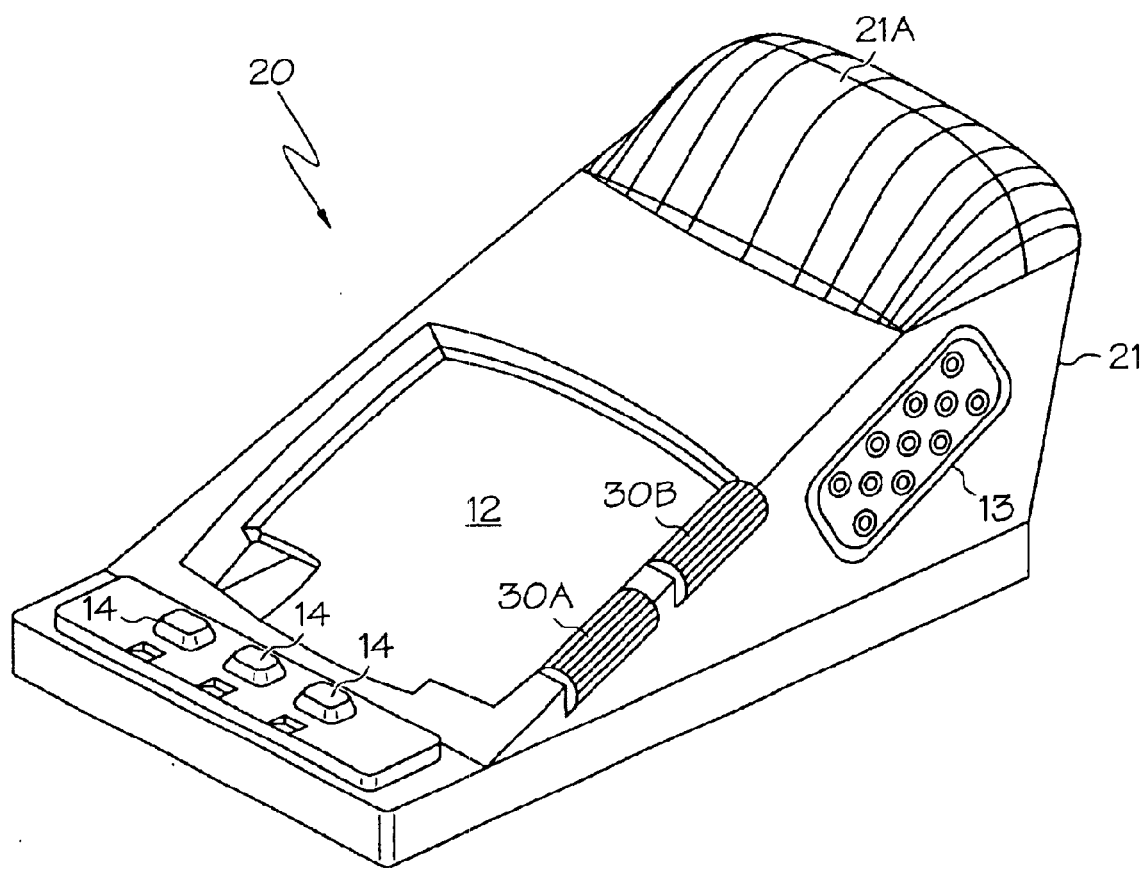
FIGS. 3A through 3C illustrate alternate embodiments of the invention.

FIG. 3A illustrates a control console 20 having in-line knobs 30 positioned along side the CCD 12 substantially parallel with the operator's wrist. Knobs 30 protrude from housing 21 sufficiently to allow them to be rotated. Knobs 30 function as one coarse knob and one fine knob. The housing 21 and wrist rest 21A are substantially similar to the preferred embodiment.

Figure 3B:
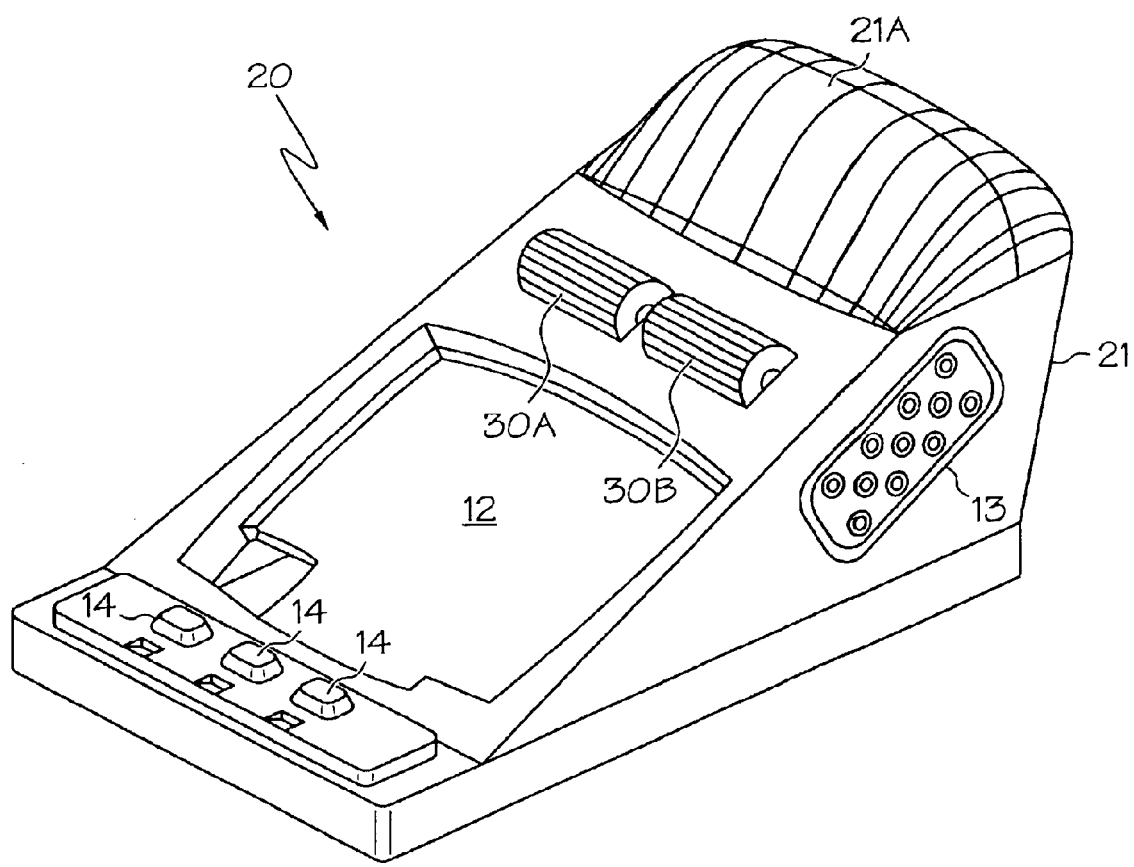

FIG. 3B illustrates a control console 20 having in-line rotary knobs located between the wrist rest 21A and CCD 12. Coarse-fine knobs 30 protrude from housing 21 and are rotated fore and aft.

Figure 3C:
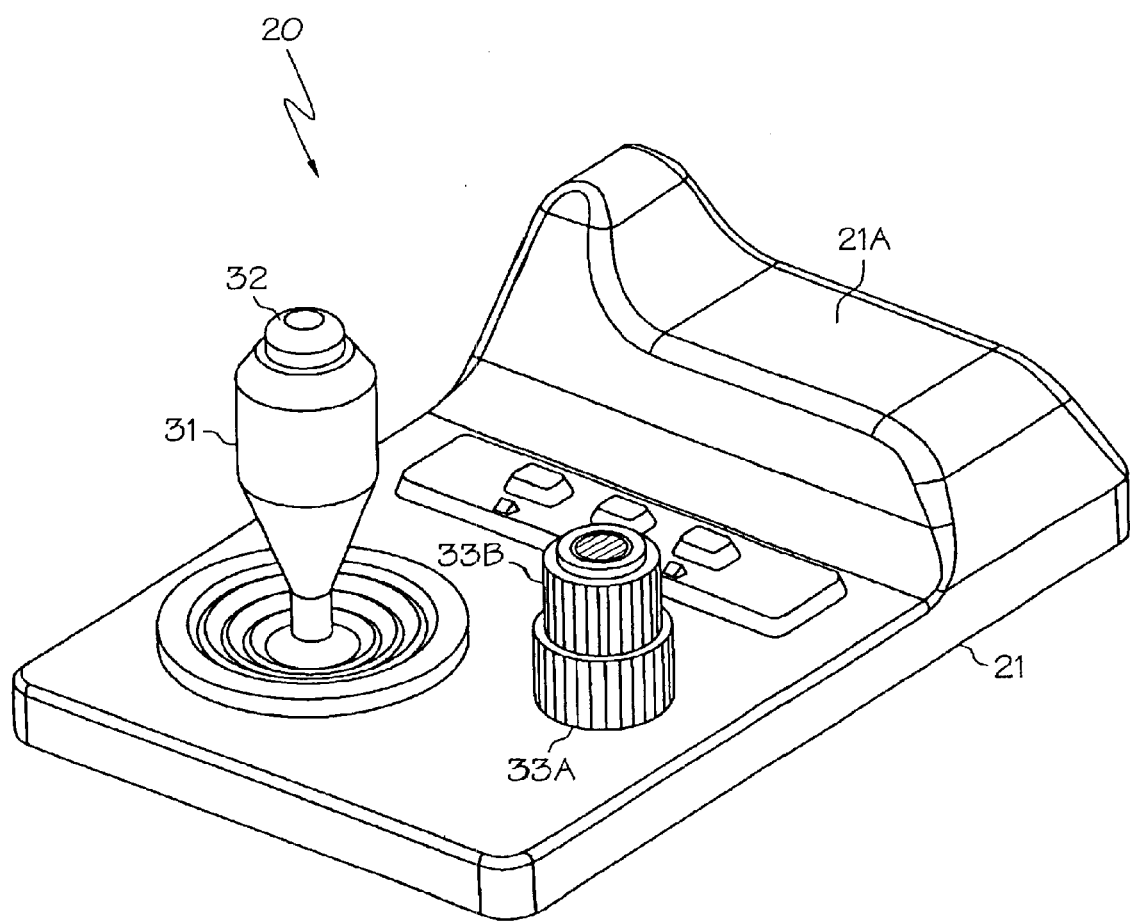

FIG. 3C illustrates the invention embodied using a joystick 31 in place of a touchpad. Joystick 31 is forward of wrist rest 21A and permits the operator to control a cursor substantially equivalent to a touchpad or other CCD. Rotary knob 33 is a conventional coarse-fine knob extending axially from housing 21 and within finger reach of joystick 31. The location of the select button 32 is moved to the top of joystick 31. Wrist rest 21A is padded and shaped differently to facilitate moving the joystick.

The method of the invention follows from the apparatus. The cursor control console with rotary knob is provided and located in a convenient position relative to the operator. The operator's hand or wrist is positioned on the wrist rest such that both the CCD and the rotary knob are within finger reach. The operator manipulates the CCD to cause a cursor to move as desired on the GUI. A representative cursor movement would be to move to a parameter which the operator desires to change such as altitude, speed, radio frequency, temperature, flight level, time, name, etc. Once the parameter is selected, the rotary knob is rotated causing the desired value to be displayed on the display device. Finally, the select button is activated causing the desired value to be entered.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention.

It is clear from the foregoing that the present invention represents a new and useful control console and method for use in aircraft and other vehicles.

What is claimed is:

1. An input device for an aircraft computer system comprising:
   a) a cursor control console including,
      1) a wrist rest portion;
   b) a cursor control device mounted on said console forward of said wrist rest portion and within finger reach of said wrist rest, said device generating cursor control signals representative of said device; and,
   c) a rotary knob mounted on said console and within finger reach of said wrist rest, said knob generating rotary signals indicative of rotation of said knob, wherein said rotary knob includes a coarse knob generating coarse rotary signals indicative of rotation of said course rotary knob, and, a fine, knob generating fine rotary signals indicative of rotating of said fine rotary knob, where said rotation of said knob corresponds to a desired alphanumeric value.

2. The input device according to claim 1 wherein said rotary knob extends axially from said console.

3. The input device according to claim 1 wherein said cursor control device is a joystick.

4. The apparatus of claim 1 further comprising:
   a) a select button mounted on said console, said select button generating signals indicative of an activation of the select button.

5. An input device for a vehicle computer system comprising:
   a) a cursor control console including,
      1) wrist rest means for supporting the wrist/hand of an operator;
   b) cursor control means, mounted on said console within finger reach of said rest means, for generating cursor control signals indicative of X-Y actuations of said cursor control means; and c) rotary input means mounted on said console and within finger reach of said rest means, said knob generating rotary signals indicative of rotation of said rotary input means, wherein said rotary input means includes a coarse knob generating coarse rotary signals indicative of rotation of said coarse rotary knob, and, a fine knob generating fine rotary signals indicative of rotating of said fine rotary knob, wherein said rotation of said knob corresponds to a desired alphanumeric value.

6. A method of input data to a vehicle computer system having a display device and cursor, said method comprising the steps of:
  a) providing a control console in communication with said computer system, said console having,
    1) a housing including a wrist rest portion;
    2) a cursor control device mounted on said housing within finger reach of said wrist rest portion, said device generating cursor control signals representative of actuation of said device; and,
    3) a rotary knob mounted on said housing within finger reach of said wrist rest portion, said knob generating rotary signals indicative of rotation of said knob, wherein said rotary knob includes, a coarse knob generating coarse rotary signals indicative of rotation of said coarse rotary knob, and, a fine knob generating fine rotary signals indicative of rotating of said fine rotary knob;
  b) manipulating said cursor control device to select a desired parameter; and
  c) rotating said rotary knob to select a desired value for said parameter, wherein said desired value comprises a desired alphanumeric value.

7. The method of claim 6 wherein said control console further comprises:
  a) a select button mounted on said console, said select button generating signals indicative of an attraction of the select button.

8. The method of claim 7 further comprising:
  depressing said select button to indicate an acceptance of said selected desired value.

* * * * *